United States Patent

[11] 3,621,926

| [72] | Inventor | Harold E. Townsend<br>Campbell, Calif. |
|---|---|---|
| [21] | Appl. No. | 705,039 |
| [22] | Filed | Feb. 13, 1968 |
| [45] | Patented | Nov. 23, 1971 |
| [73] | Assignee | General Electric Company |

[54] NUCLEAR REACTOR COOLANT RECIRCULATION SYSTEM
12 Claims, 3 Drawing Figs.

[52] U.S. Cl. ..................................... 176/56, 176/50
[51] Int. Cl. ........................................ G21c 15/24
[50] Field of Search ............................ 176/54, 55, 56, 61

[56] References Cited
UNITED STATES PATENTS

| 3,400,047 | 9/1968 | Howard ....................... | 176/61 X |
| 3,446,704 | 5/1969 | Hannerz et al ................ | 176/61 |

*Primary Examiner*—Rueben Epstein
*Attorneys*—Ivor J. James, Jr., Samuel E. Turner, John R. Duncan, Frank L. Neuhauser, Oscar B. Waddell and Melvin M. Goldenberg ABSTRACT: A feedwater augmented jet pump coolant recirculation system for nuclear reactors is disclosed. In this system feedwater is used to drive some of the jet pumps. The majority of the jet pumps are operated at constant flow, while flow control is provided by varying the flow of another part of the feedwater between a feedwater sparger within the pressure vessel and the remaining pumps.

PATENTED NOV 23 1971  3,621,926

INVENTOR:
HAROLD E. TOWNSEND

BY John R. Duncan
ATTORNEY

NUCLEAR REACTOR COOLANT RECIRCULATION SYSTEM

BACKGROUND OF THE INVENTION

In one type of commercial nuclear power reactor, the coolant is water which is partially evaporated in the core. The resulting steam is separated from the water within the reactor vessel and is directed to a load, such as a turbine. The water separated from the steam is recirculated through the core. Modern boiling water reactors increase core power density by using a mechanical pumping system to force the water through the core.

A series of jet pumps, located within the reactor pressure vessel in an annulus between the core shroud and pressure vessel inner wall, have been found to be a highly efficient coolant recirculation system. Driving flow to the jet pumps is provided by large centrifugal pumps driven by variable-speed electric motors.

Reactor power output is varied by adjustment of the reactor recirculation flow through the variable-speed motors. Reactor power changes are accomplished by utilizing the negative power coefficient. An increase in recirculation flow temporarily reduces the volume of steam in the core by removing the steam at a faster rate. This increases the reactivity and, therefore, the heat output of the core since a greater proportion of the core contains moderating water, which causes the reactor power level to increase. The increased steam generation rate increases the steam volume in the core with a consequent negative reactivity effect, and a new, higher, constant power level is established. When recirculation flow is reduced, the power level is reduced in a similar manner. Typical jet pump coolant recirculation systems are described in copending U.S. Pat. applications of J. M. Roberts, now U.S. Pat. No. 3,378,456 issued Apr. 16, 1968, and of D. E. Hughes, now U.S. Pat. No. 3,389,055 issued June 18, 1968, both assigned to the assignee of the present application.

This coolant recirculation system is highly effective. However, further improvements in the system can be achieved. The recirculation pumps, associated piping and the variable-speed pump drive motors are very large and expensive. In a large power plant, of approximately 600 MWE, this piping has a diameter on the order of 24 inches. It would be highly desirable to eliminate the variable-speed motors and decrease the size of the piping while retaining the highly desirable ability to vary reactor power output by recirculation flow control.

SUMMARY OF THE INVENTION

It is, therefore, an object of this invention to provide a reactor coolant recirculation system overcoming the above-noted problems.

It is another object of this invention to provide a variable coolant recirculation system which does not require variable-speed electrical motors.

It is still another object of this invention to reduce the size of pumps and piping required to obtain a given coolant recirculation flow rate.

The above objects, and others, are accomplished in accordance with this invention by providing a reactor coolant recirculation system which includes a plurality of jet pumps driven by constant-speed pumps, with a second group of jet pumps driven by reactor feedwater. Recirculation flow control is accomplished by regulating feedwater flow split between the feedwater-driven jet pumps and the feedwater sparger.

BRIEF DESCRIPTION OF THE DRAWING

Details of the invention will be further understood upon reference to the drawings, wherein.

DETAILED DESCRIPTION OF THE INVENTION

Figure 1:
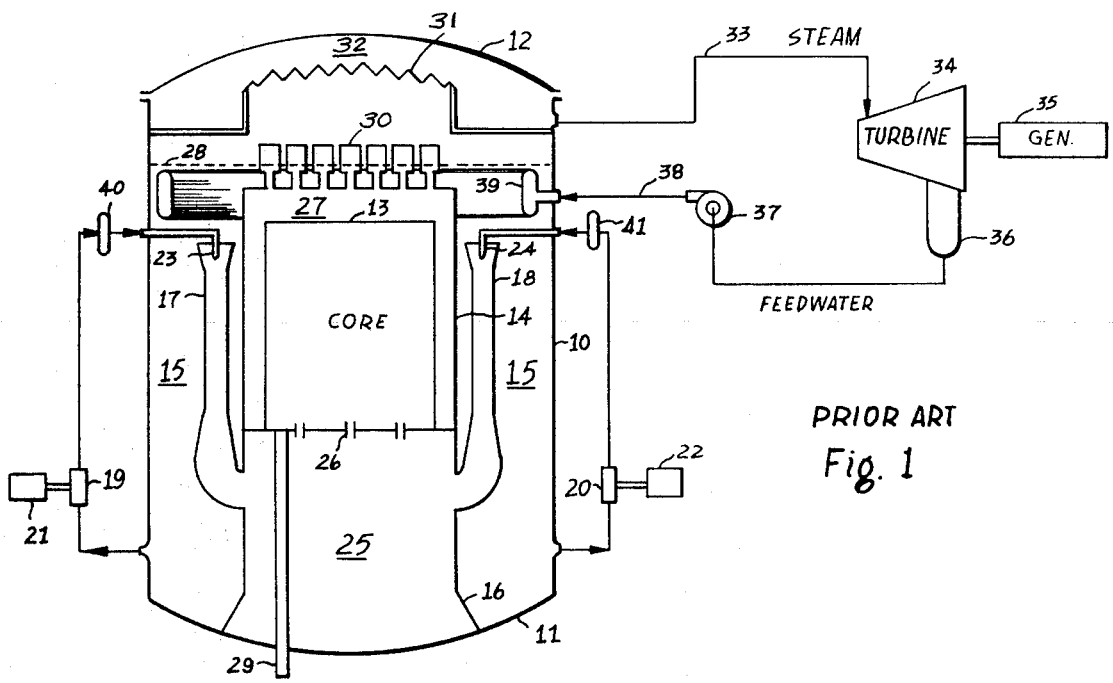
FIG. 1 shows a simple schematic representation of a variable-recirculation system according to the prior art.

Referring now to FIG. 1, there is seen a simple schematic elevation of a variable-recirculation nuclear power plant such as is in present commercial use. The nuclear reactor is enclosed in an upright cylindrical pressure vessel 10, closed at the lower end by a dish-shaped bottom head 11 and at the top by a removable dome-shaped top head 12. A conventional reactor core 13 is located within core shroud 14 mounted coaxially within pressure vessel 10 so that an annular downcomer space 15 is formed between shroud 14 and the inner wall of pressure vessel 10. Shroud 14 is supported by bottom head 11 through flaring skirt portion 16.

A plurality of upright jet pumps is located in downcomer space 15 with their discharge ends penetrating shroud 14. Only two of these jet pumps, designated 17 and 18, are shown, for clarity. Driving fluid is supplied to jet pumps 17 and 18 by recirculation pumps 19 and 20, respectively, driven by variable-speed motors 21 and 22, respectively. A high speed jet of water is directed into jet pumps 17 and 18 through nozzles 23 and 24, respectively. Water in downcomer 15 is entrained and forced into lower plenum 25. The water then passes upwardly through core 13 through passages schematically indicated at 26. As the water-steam mixture exits the core into upper plenum 27, steam is separated and the water returns to downcomer space 15. In typical commercial practice, at least two manifolds 40 and 41 are arranged adjacent the reactor pressure vessel, each manifold supplying driving fluid to a proportional share of the jet pumps, with an independent variable-speed motor and pump set supplying water to each manifold 40 and 41.

The water level in pressure vessel 10 is maintained at about the level indicated by dashed line 28 above the inlet end of jet pumps 16 and 17.

As water passes upwardly through core 13, it extracts heat and a portion is evaporated, forming steam bubbles. The quantity of heat generated in the core is controlled in part by control rods, one of which is schematically indicated at 29. As discussed above, the reactivity of core 13, and the resulting heat output, are further controlled by adjusting the rate of coolant flow through core 13 by adjusting the speed of variable-speed motors 21 and 22 driving recirculation pumps 19 and 20.

A mixture of water and steam leaves core 13 and enters upper plenum 27. As the mixture passes upwardly through steam separators 30 and steam dryers 31, water is returned to downcomer space 15 and steam enters steam space 32.

Steam leaves steam space 32 and passes through steam line 33 to a load, which in this instance is illustrated by turbine 34. Turbine 34 drives generator 35 to produce electric power. Steam leaving turbine 34 is condensed in condenser 36. After any desired treatment, such as demineralization and pre-heating, the condensate is pumped by feedwater pump 37 through line 38 back to reactor pressure vessel 10, where it enters downcomer space 15 through perforated feedwater sparger 39.

This system has proven to be highly effective in typical commercial applications. However, in a typical large power plant, which produces about 600 MWE, it is necessary that the recirculation pumps be capable of circulating about $72 \times 10^6$ pounds of water per hour through the core, with the capability of varying recirculation over a range of about 80—100 percent of this amount. Thus, it is apparent that pumps 19 and 20 and variable-speed motors 21 and 22 must be very large and sturdy to accommodate this flow rate. Very large diameter piping must be used in the recirculation system to permit the required flow rates. Thus, it is apparent that simplification of this system would permit great savings in capital and operating costs and would permit the construction of very large plants beyond the capacity of present pumping systems.

Figure 2:
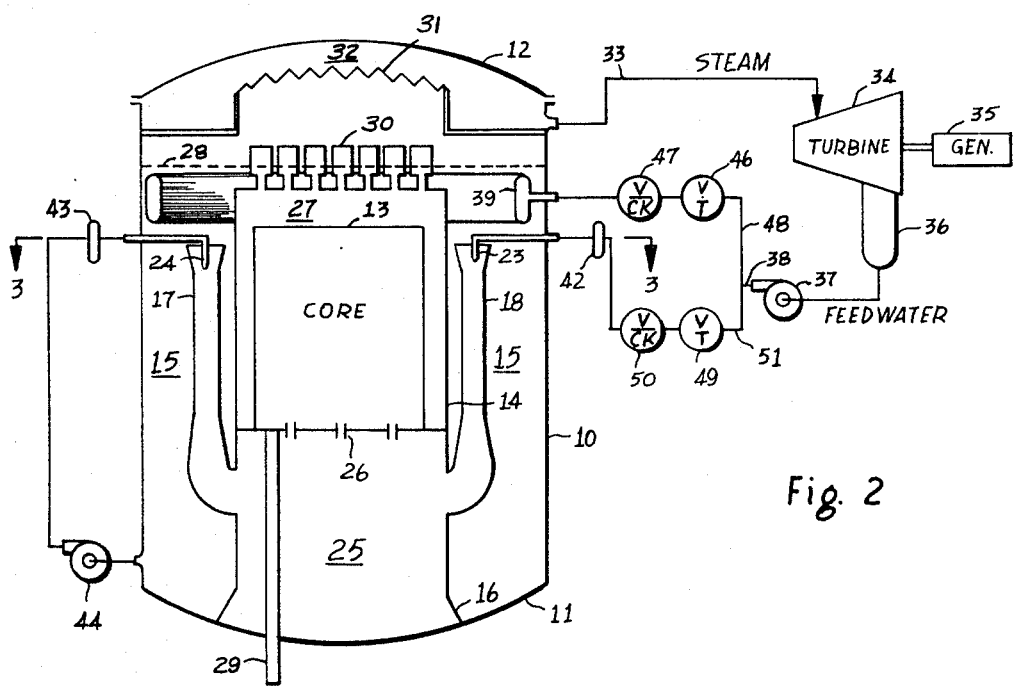
FIG. 2 shows a simple schematic representation of a variable-recirculation system according to this invention.

FIG. 2 shows a simple schematic representation of a variable coolant recirculation system according to this invention. In general, the plant is similar to that shown in FIG. 1. The same reference numerals are used in FIG. 2 to indicate components which are substantially identical to those shown in FIG. 1.

Figure 3:
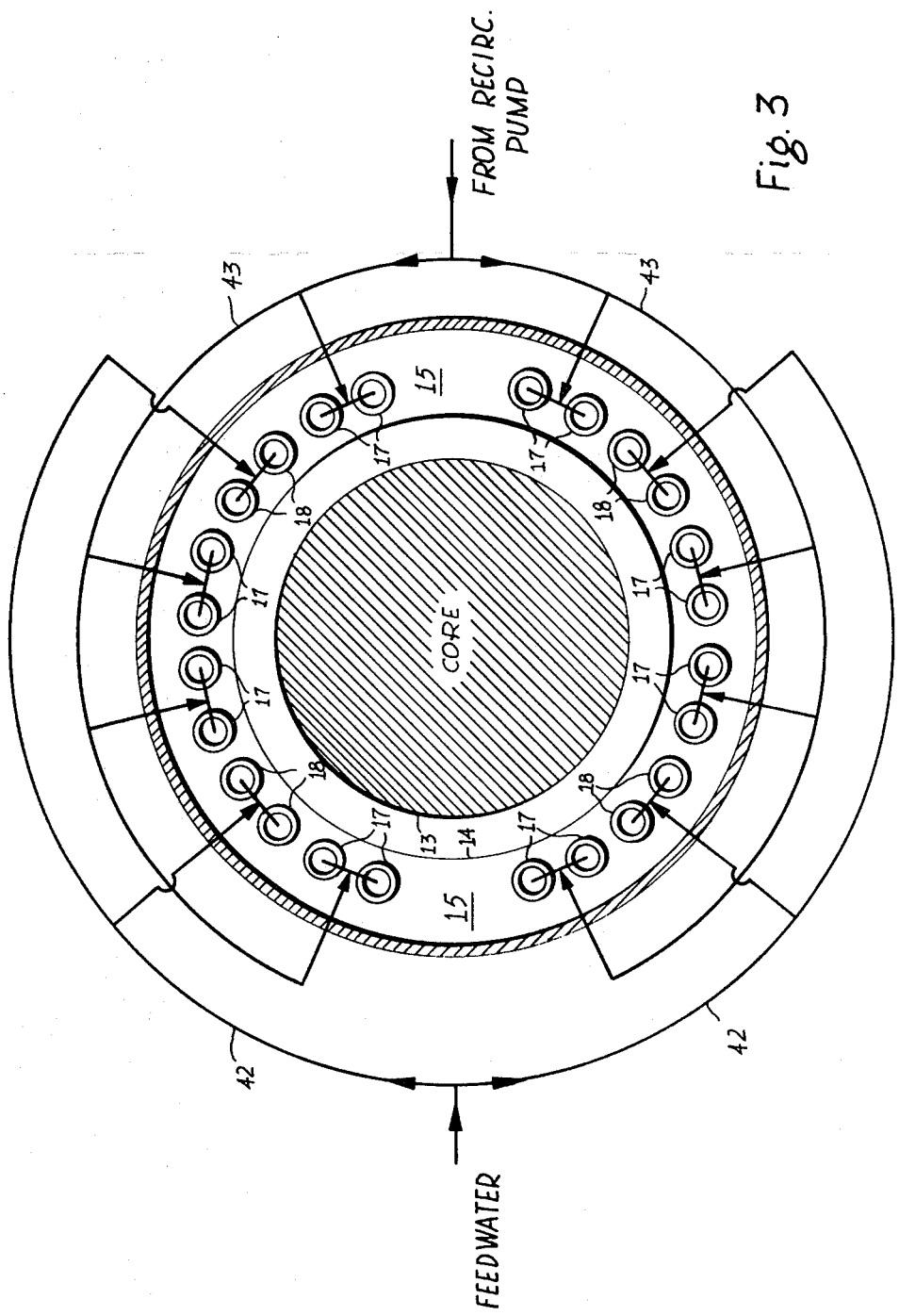
FIG. 3 is a schematic representation of a horizontal section taken through FIG. 2 on line 3—3.

The reactor internals are generally the same in the embodiments shown in FIGS. 2 and 3. However, the arrangement for feeding driving fluid to jet pump nozzles 23 and 24 is modified in the embodiment of FIG. 2. Typically, a majority of the jet pumps (e.g. 16 of 24) receive driving fluid from at least one manifold 43 supplied by at least one constant-speed (or, if desired two-speed) recirculation pump 44 which includes an integral drive means. The expensive variable-speed drives for the pumps are thus eliminated. In addition, the recirculation piping may have a smaller diameter, since fewer jet pumps are being supplied (typically, 16 of 24) by the recirculation pumps.

While generally pump 44 may be operated at a single constant-speed under some very low power operating conditions and during reactor startup, it may be desirable to operate pump 44 at a second, lower, constant speed. In such a case, the integral drive with pump 44 could be a simple conventional two-speed electric motor.

The remaining minority of the jet pumps (e.g. 8 of 24) are supplied with feedwater as driving fluid from feedwater pump 37 through manifold 42. This pump 37 is also a constant-speed pump. Flow of driving fluid to the nozzles of these jet pumps is varied by a valve system which divides feedwater flow between the feedwater sparger 39 and jet pump nozzles 23.

As seen in FIG. 2, the flow-dividing system may consist of a first section consisting of a throttle valve 46 and a check valve 47 in a line 48 between feedwater pump 37 and feedwater sparger 39 and a second section consisting of a throttle valve 49, a check valve 50 in a line 51 between feedwater pump 37 and manifold 42 feeding jet pump nozzles 23. Thus, divided flow may be adjusted by opening one of valves 46 and 49 while closing the other. Valves 46 and 49 may be ganged together for simultaneous opposite operation, if desired. Alternatively, a single dividing valve may be used at the junction of lines 38, 48 and 51, if desired, instead of throttle valves 46 and 49. However, the throttle valve system is preferred since throttle valves 46 and 49 may be used together to vary the total flow of feedwater into pressure vessel 10 to maintain water level 28 at the desired position. Check valves 47 and 50 prevent undesirable backflow of coolant through lines 48 and 51.

FIG. 3 schematically shows a section taken through FIG. 2 showing the arrangement of manifolds by which driving flow is directed to a typical jet pump array. In this embodiment the jets are grouped in pairs in downcomer annulus 15 between core shroud 14 surrounding core 13 and the inner wall of pressure vessel 10. Eight jet pumps 18 are driven by feedwater through manifold 42 while sixteen jet pumps 17 are driven by recirculation water from the recirculation pumps through manifold 43. If desired, manifold 43 may be divided into two portions, with each portion of manifold 43 supplying eight jet pumps from an individual recirculation pump.

Thus, this system replaces expensive, very large, variable-speed motor-driven recirculation pumps with smaller single-speed recirculation pumps, while obtaining recirculation rate control by augmenting recirculation with variable feedwater driven jet pumps. Flow of feedwater to the feedwater-driven jet pump nozzles can be varied from substantially no flow to nearly 100 percent of the available feedwater. It is generally desirable, however, to return a portion of the feedwater to the feedwater sparger to provide subcooling to the driven flow entering the jet pumps from the downcomer space. Subcooling is necessary since if the temperature of the driven flow is too high, it may flash into steam in the high-velocity—low-pressure throat portion of the jet pumps. In general, up to about 80 percent of the feedwater flow may be directed to the jet pump nozzles.

This system has the additional advantage of providing an additional path for introducing emergency cooling water into the reactor in the event of an accident resulting in a loss of cooling. Emergency cooling water injected through the feedwater line to the feedwater driven jet pumps immediately enters the lower plenum and core areas. In the prior art system, feedwater enters the sparger and the annular downcomer space instead.

In general, up to about one-half of the jet pumps may be feedwater-driven. While it is possible to drive an even higher proportion of the jet pumps with the available feedwater, this would require pumps with a ratio of driven-to-driving fluid of greater than 3. These high-ratio pumps tend to have reduced pumping efficiency and thus require additional driving power. Such systems are complex, often requiring a multiple-pump series arrangement. In general, if a system requires low recirculation flow rates and produces steam of a high core exit quality, a greater proportion of the jet pumps may be feedwater driven without undesirably increasing the driven-to-driving flow ratio above 3.

DESCRIPTION OF A PREFERRED EMBODIMENT

Details of the invention will become further apparent upon reference to the following detailed description of a power plant using the variable recirculation system of the invention, with a general comparison to prior variable recirculation systems.

A plant is constructed as schematically shown in FIG. 2 with 24 jet pumps located as shown in FIG. 3. The cylindrical reactor pressure vessel has an internal diameter of about 21 feet and a height of about 73 feet. Within the pressure vessel, the core is located within a core shroud having a diameter of about 17.2 feet mounted coaxially with the pressure vessel.

In the annulus formed between the pressure vessel and the core shroud are mounted 24 jet pumps, each having an overall length of about 16 feet and a throat diameter of about 8 inches. These jet pumps are designed to operate at a ratio of driven-fluid-to-driving-fluid of about 2.26:1 and a jet pump efficiency of about 31.8 percent. The reactor core is designed to produce about 3,293 MWT. Since total required recirculation flow at full power is about $102.5 \times 10^6$ pounds per hour, these jet pumps require about $31.5 \times 10^6$ pounds per hour of driving flow through the jet pump nozzles.

In prior recirculation systems applicable to the above plant, this entire driving flow would be supplied by two recirculation loops, each supplying 12 jet pumps. Each loop required 28-inch diameter drive pump suction and discharge lines and a 22-inch diameter distribution manifold to direct flow to the jet pumps. Each of the two pumps was driven by a large frequency control motor-generator set. The drive motors had a 7,050 BHP rating and required 13,460 kwe. power. Each pump was required to pump 45,000 g.p.m.

In the system of this invention, 16 of the jet pumps receive driving flow from pumps driven by single speed motors while the remaining 8 jet pumps are feedwater driven. Since each of the two recirculation loops needs to supply driving fluid to only 8 jet pumps, 22-inch diameter drive pump suction and discharge lines and an 18-inch diameter distribution manifold may be used. Since the single-speed pump drives are simpler and more efficient and need only pump 28,000 g.p.m., they may have a rating of 4,750 BHP and draw only 7,600 kwe. power. While the prior system could use smaller piping and pumps by increasing the number of recirculation loops, this is undesirable since it would increase the number of drive motors, pumps, etc.

The 8 remaining jet pumps are driven by feedwater. Total feedwater flow is about $13.38 \times 10^6$ pounds per hour. A minimum of about $2.88 \times 10^6$ pounds per hour of this should be directed to the feedwater sparger to provide suction flow subcooling. This quantity provides about 5 b.t.u./lb. subcooling. Generally, jet pump efficiency is not adversely affected unless subcooling drops below 3 b.t.u./lb. Thus, up to about 2/5, or about $1.15 \times 10^6$ lb./hr. may be shut off for water level control without adversely affecting jet pump performance. About $10.5 \times 10^6$ lb./hr. of the feedwater is available for recirculation. Essentially all of this $10.5 \times 10^6$ lbs./hr. may be directed to the feedwater sparger when desired, reducing reactor power by about 30 percent. Motor-operated throttle valves are used to divide feedwater flow between the feedwater sparger and the jet pumps. Of course, the feedwater pump must have slightly higher capacity than in the prior art system, since it must overcome losses in the throttle valves, jet pump nozzles, etc.

This system is capable of varying recirculation flow from about 70 to 100 percent of rated flow. Where it is desired to provide for even lower flow rates, for example during startup and very low-power operation, the main recirculation pumps may be provided with 2-speed rather than single-speed motors. While these motors are more expensive than single-speed motors, they are still much less expensive than infinitely-variable-speed motors or drive systems.

Although specific sizes, proportions and arrangements have been described in the above description of a preferred embodiment, these may be varied within the scope of this disclosure, depending upon specific desired conditions, with similar results.

Other modifications and ramifications of the invention will become apparent to those skilled in the art upon reading the present disclosure. These are intended to be included within the scope of this invention.

I claim:

1. In a heat-generating reactor apparatus comprising a nuclear chain-reacting core within a pressure vessel having an inlet and an outlet through which water flows to be heated; the improvement comprising circulating water through the core by means of:
   a. a first plurality of jet pumps; at least one recirculation pump, means to drive said pump at constant speed, means to direct pump suction water from said pressure vessel to said recirculation pump and means to direct recirculation pump discharge to the nozzles of said first plurality of jet pumps; and
   b. a second plurality of jet pumps; a feedwater sparger within said pressure vessel; feedwater pump means to direct at least a portion of said feedwater to said feedwater sparger and to direct the remainder of said feedwater to the nozzles of said second jet pumps.

2. The apparatus according to claim 1 wherein up to about one-half of the total jet pumps are feedwater driven.

3. The apparatus according to claim 1 wherein said jet pumps are located in a water-filled annulus between the reactor core and the inner wall of the pressure vessel.

4. The apparatus according to claim 1 wherein said recirculation pump drive means is adapted to drive said recirculation pump at either of two constant speeds.

5. In a heat-generating reactor apparatus comprising a nuclear chain-reacting core within a pressure vessel; an inlet plenum at one end of said core, an outlet plenum at the other end of said core and passages through said core through which water may be flowed to be heated; a feedwater sparger within said pressure vessel to permit introduction of feedwater thereinto; and a plurality of jet pumps located in a water-filled annulus between said core and the inner wall of said pressure vessel, said jet pumps positioned to receive driven water from said outlet plenum and to discharge into said inlet plenum; the improvement comprising: at least one constant-speed pump arranged to pump water from said annulus to the nozzles of a first group of said jet pumps; a feedwater pump arranged to direct at least a portion of the feedwater to said feedwater sparger, and dividing means to selectively direct the remainder of said feedwater to the nozzles of a second group of said jet pumps.

6. The apparatus according to claim 5 wherein up to about one-half of the total jet pumps are feedwater driven.

7. The apparatus according to claim 5 wherein up to about 80 percent of the feedwater is directed to the nozzles of said second group of jet pumps.

8. The apparatus of claim 5 further including means to drive said constant-speed pump at either of two preselected constant speeds.

9. A process for recirculating cooling water through a nuclear chain-reacting core in a reactor vessel which comprises:
   a. arranging a plurality of jet pumps to receive water from the core outlet and to return it to the core inlet:
   b. pumping water at a constant rate from only said core outlet to the nozzles of a first group of said jet pumps;
   c. pumping feedwater at a constant rate toward said reactor vessel; and
   d. selectively dividing said feedwater flow so that at least a portion is introduced directly into said reactor vessel and the remainder is introduced directly to the nozzles of a second group of said jet pumps.

10. The process according to claim 9 wherein up to about 80 percent of the feedwater flow is passed to the nozzles of said second group of said jet pumps.

11. The process of claim 9 wherein the rate at which water is pumped to the nozzles of said first group of jet pumps may be set at either of two preselected rates.

12. The process of claim 9 wherein up to about one-half of the total recirculation flow is produced by the feedwater-driven jet pumps.

* * * * *